United States Patent [19]

Hines

[11] 4,279,488
[45] Jul. 21, 1981

[54] CAMERA WITH FLASH THROUGH VIEWFINDER

[75] Inventor: Stephen P. Hines, Rochester, N.Y.

[73] Assignee: Eastman Kodak Company, Rochester, N.Y.

[21] Appl. No.: 158,749

[22] Filed: Jun. 12, 1980

[51] Int. Cl.³ .................. G03B 15/03; G03B 13/02
[52] U.S. Cl. .................................. 354/145; 354/219
[58] Field of Search .......... 354/152, 81, 126, 62, 354/136, 165, 219–225, 150, 145, 245

[56] References Cited

U.S. PATENT DOCUMENTS

| | | | |
|---|---|---|---|
| 2,940,371 | 6/1960 | Thurow | 354/81 |
| 2,947,216 | 8/1960 | Drews | 354/136 X |
| 3,008,398 | 11/1961 | Sanborn | 354/165 |
| 3,575,081 | 4/1971 | Nerwin | 354/219 |
| 3,955,206 | 5/1976 | Hashimoto | 354/245 X |
| 3,961,344 | 6/1976 | Baisch et al. | 354/222 |
| 4,072,969 | 2/1978 | Cheavin | 354/219 X |
| 4,200,380 | 4/1980 | Sato et al. | 354/219 |

*Primary Examiner*—Donald A. Griffin
*Attorney, Agent, or Firm*—Thomas H. Close

[57] ABSTRACT

Disclosed herein is a photographic camera having an integral flash unit which illuminates object space through the camera's viewfinder. According to a preferred embodiment, light from an energized flashlamp mounted within the camera interior is reflected into object space by means of a mirror which is pivotally mounted in the camera's viewfinder. Prior to shutter release, the mirror is stored in a position to allow normal use of the viewfinder. In response to actuation of the camera's shutter release mechanism, the mirror pivots to a position on the optical path of the viewfinder, whereupon it reflects light emanating from the flashlamp through the front of the viewfinder and into object space.

14 Claims, 7 Drawing Figures

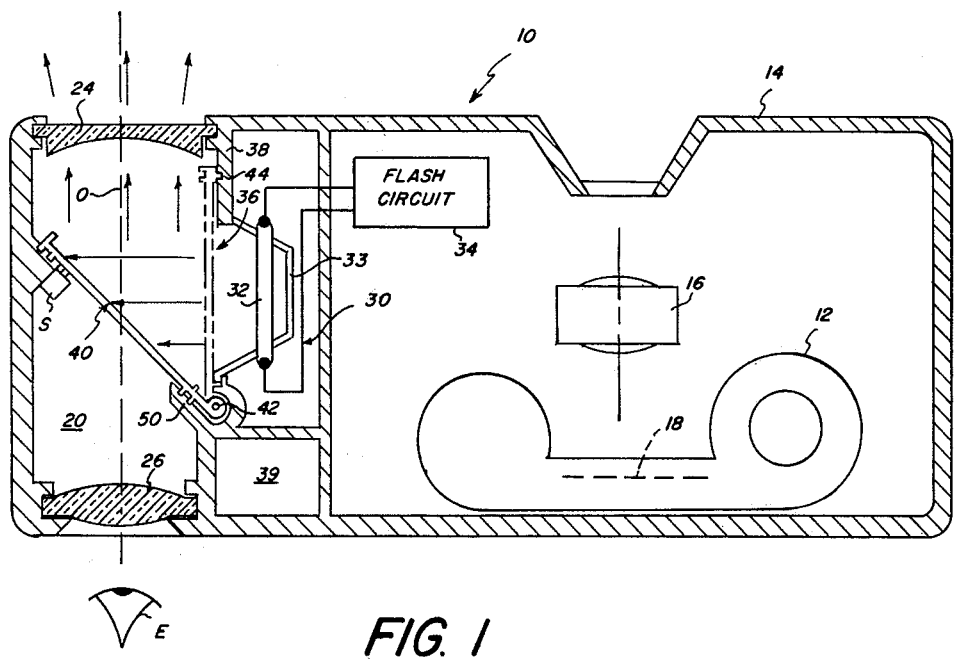
FIG. 1
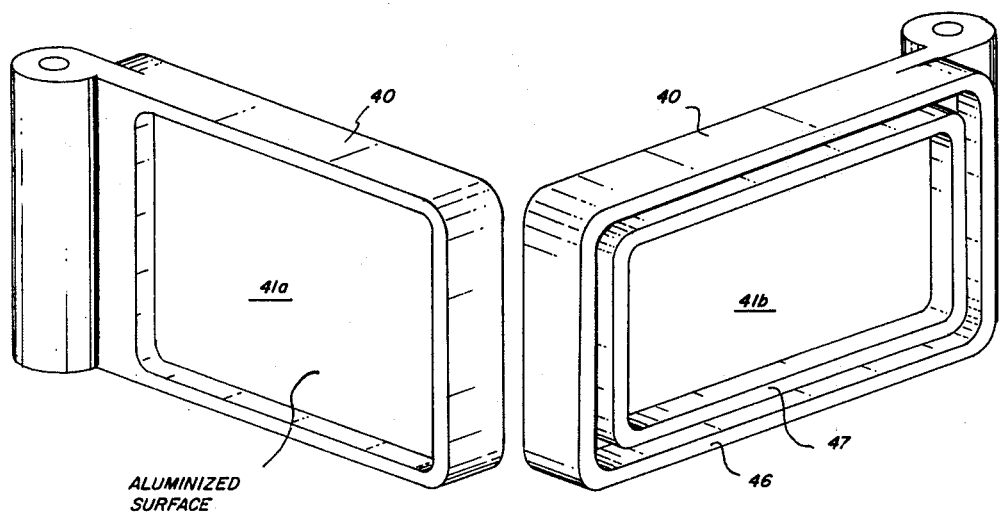
FIG. 2a
FIG. 2b

CAMERA WITH FLASH THROUGH VIEWFINDER

BACKGROUND OF THE INVENTION

The present invention relates to photographic cameras which include, as an integral part, a flash unit for momentarily illuminating objects to be photographed. More particularly, the invention relates to a camera in which light from an integral flash unit is directed into object space through the camera's viewfinder.

Generally speaking, electronic flash units of the type used with photographic still cameras are either of an accessory nature, being detachably coupled to the top or the side of the camera housing, or of an integral nature, being built-in to the camera housing. Examples of cameras having accessory and integral flash units are respectively disclosed in U.S. Pat. No. 3,437,021 and 3,357,328.

While cameras having integral flash units are usually less bulky and, hence, less cumbersome to use and carry than cameras requiring accessory-type flash units, they are nevertheless considerably bulkier than cameras having no flash capability. The reason for this increased bulk is that it has been common heretofore to position the unit's flashlamp and its associated optical elements on the front surface of the camera housing. Since these elements consume space, the camera housing must be of a size to accommodate them. Added to the disadvantage of the increased bulk, the placement of a flash unit on the front surface of the camera housing often detracts from the aesthetic appearance of the camera. In these days of ever-increasing interest in minimizing camera bulk and streamlining camera design, it would be desirable for a camera having an integral flash unit to be no bulkier than and be as streamlined as a camera without flash capability.

To satisfy the above desire, some cameras embodying integral flash units store the flash unit out of sight within the camera housing. For example, in U.S. Pat. No. 4,153,355 issued on May 8, 1979, a camera is disclosed having an integral flash unit which is slidably mounted on the camera housing for movement between a retracted position with the camera housing and a pop-up position outside the housing. In its retracted position, the flashlamp is inoperable and hidden from sight; in its pop-up position, the flashlamp is in an exposed position to illuminate the scene. When not being used, cameras of this type are only slightly bulkier than similar cameras having no flash capability; in use, however, the flashlamp is located where it can be mishandled and damaged, or worse yet, can cause injury to the camera user.

In addition to the aforementioned disadvantages, cameras embodying integral flash units are particularly subject to the so-called "finger-over flash" failure. As cameras become increasingly smaller in size, proper handling of the camera at the time of exposure becomes more critical. Human factors engineers report that a substantial percentage of underexposed photographs is caused by an obstruction in the optical path of the flashlamp. Typically, this obstruction is the photographer's finger which, during the picture composing period, becomes inadvertently moved to an obstructing position. It would be desirable, therefore, for a camera user to be able to detect such an obstruction prior to shutter actuation so that he can take corrective measures.

SUMMARY OF THE INVENTION

Now in accordance with the present invention, there is provided a photographic camera having an integral flash unit which adds no substantial bulk to the camera housing; nor does the flash unit detract from the aesthetic appearance of the camera, since prior to shutter actuation, the flash unit is not externally visible. Only at the initiation of shutter actuation does the flashlamp become visible and capable of illuminating object space. According to a preferred embodiment, a flash unit is mounted inside the camera housing so that its flashlamp is positioned adjacent the optical path of the viewfinder. Prior to exposure, the viewfinder is unobstructed and normal viewing of objects to be photographed can be effected therethrough. During movement of a shutter release mechanism, however, a movable mirror is moved within the viewfinder to a position in which it momentarily obstructs viewing and serves to reflect light emanating from the flashlamp through the viewfinder and into object space. Preferably, the mirror forms part of an interlock mechanism which prevents flashlamp energization except when the mirror is in position to reflect flashlamp energy into object space. After exposure, the movable mirror is returned to an unobstructing position to allow normal use of the viewfinder.

According to an alternative embodiment, a movably mounted flashlamp assembly is moved, just prior to shutter actuation, from a position to one side of the optical path of the viewfinder to a position on the optical path so that, upon energizing the flashlamp, light is projected through the viewfinder into object space.

As will be readily appreciated, the camera of the invention is not subject to the aforementioned "finger-over flash" failure. Since the flashlamp illuminates object space along the same optical path as that used by the viewfinder, the camera user is able to see, while composing the picture through the viewfinder, any obstruction in this optical path.

The invention and its various advantages will become more apparent to those skilled in the art from the ensuing detailed description of the preferred embodiments, reference being made to the accompanying drawings.

BRIEF DESCRIPTION OF THE DRAWINGS

FIG. 1 is a cross-sectional view of a photographic camera incorporating a preferred embodiment of the invention;

FIGS. 2A and 2B are enlarged perspective views of a movable mirror embodied in the camera shown in FIG. 1;

DETAILED DESCRIPTION OF PREFERRED EMBODIMENTS

Figure 3:
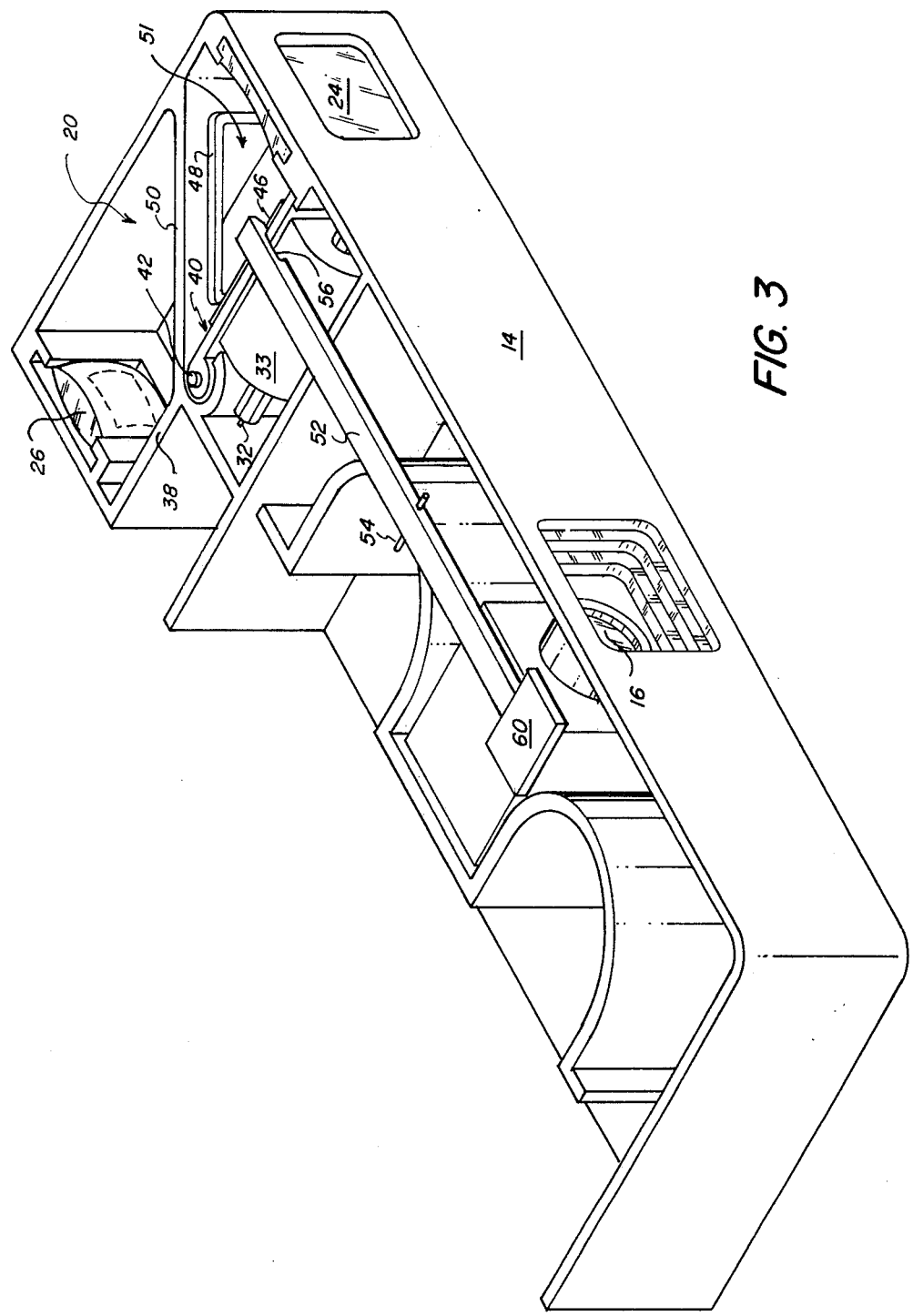
FIG. 3 is an enlarged perspective view showing more details of the FIG. 1 camera.

Referring now to the drawings, FIG. 1 is a sectional view of a conventional pocket-sized camera 10 which is designed to expose film contained in a film cartridge 12. Camera 10 basically comprises a housing 14 which supports a lens 16 for focusing light from object space OS at an image plane 18 at which the photosensitive film in cartridge 12 is positioned. A viewfinder 20 is provided at one end of housing 10 to assist the camera user in framing objects to be photographed at the image plane. Viewfinder 20 basically comprises front and rear optical elements 24 and 26, respectively, which cooperate in forming a virtual image of objects to be photographed which can be seen by the eye E of the camera user through the rear optical element 26. Optical elements 24 and 26 are arranged in a conventional manner on a common optical axis 0.

Now, according to the present invention, there is provided within the camera housing 10 an integral flash unit 30 which cooperates with a movably mounted mirror 40 to illuminate object space, in the manner described below, through the front of the viewfinder. Flash unit 30 basically comprises a flashlamp 32, a reflector 33 and a conventional energizing circuit 34. Since flashlamp energizing circuitry is well known and forms no part of the present invention, this circuitry is shown schematically. Flashlamp 32 is positioned adjacent to an aperture 36 formed in an interior side wall 38 of housing 10, such wall normally functioning as a light baffle to prevent light entering the viewfinder from exposing the photosensitive film in cartridge 12.

Movable mirror 40 preferably comprises a lightweight plastic material (e.g. polystyrene) which has been molded to the shape shown. The central planar region of one side is provided with an aluminum coating or the like to provide a reflective surface 41A. The rest of the mirror is provided with a non-reflecting (e.g. flat black) finish. Mirror 40 is supported for pivotal movement by a pin 42 mounted on the camera housing, and is thereby movable between an inoperative first position and an operative second position, shown in phantom and solid lines, respectively, in FIG. 1.

Spring means (not shown) are provided for biasing mirror 40 for movement toward its operative second position. In its inoperative first position, mirror 40 cooperates with interior wall 38 to form a light seal which prevents light from lamp 32, if inadvertently energized, from being seen in the viewfinder 20. As best shown in FIG. 2A, the reflective side 41A of mirror 40 is provided with an endless flange 43 around the periphery thereof which cooperates with a similarly shaped groove 44 formed on interior wall 38 to form the light seal. In its operative second position, mirror 40 extends at a 45° angle with respect to the optical axis 0 of the viewfinder optics and the reflective surface thereof serves to redirect energy emanating from flashlamp 32 into object space through viewfinder element 24, as shown by the arrows. In its operative position, a pair of concentric endless flanges 46 and 47, formed near the periphery on the non-reflective side 41B of mirror 40, cooperates with a similarly shaped flange 48 formed on an angularly extending wall 50 in the viewfinder (see FIG. 3) to provide a light seal and thereby prevent flashlamp energy from being seen by the eye of the camera user. Wall 50 is provided with an aperture 51 through which viewfinding is effected when mirror 40 is in its flashlamp-capping, non-obstructing, first position.

In order to assure that mirror 40 is in its operative position at the time of flashlamp energization, a microswitch S is positioned to be actuated by the moving mirror when it reaches its light-sealing position against flange 48. Upon being actuated, microswitch S functions to initiate the exposure cycle (e.g. by opening the leading blade of the shutter mechanism) and to energize the flashlamp during the exposure period. After exposure, mirror 40 is returned to its inoperative first position in a conventional manner, such as via the film advancing mechanism of the camera. Coupling the mirror return to the film advancing mechanism offers the advantage of preventing use of the viewfinder until the new film frame is in position for exposure and the shutter mechanism is cocked and ready for exposure.

In FIG. 3, a simple shutter release mechanism is shown for capturing the mirror in its inoperative first position. In use, shutter release pad 60 is depressed, in the direction of the arrow, thereby pivoting arm 52 about pin 54. During this pivotal movement, mirror 40 is released from a notch 56 formed in arm 52 and, due to its spring bias, the mirror moves in the direction of the arrow to its operative second position against wall 50. Upon reaching its second position, mirror 40 actuates microswitch S to commence the exposure and flashlamp energization process.

Figure 4:
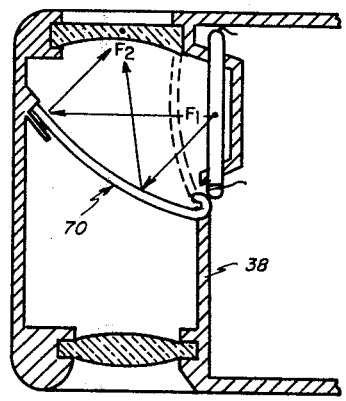
FIGS. 4 and 5 illustrate alternative optical systems for use in the FIG. 1 camera.

In FIG. 4, the planar reflecting surface of mirror 40 (discussed above) has been modified to be elliptical in shape. As in the case of planar mirror 40, elliptical mirror 70 is pivotally mounted to the interior wall 38 of the camera housing for movement between an inoperative first position (shown in phantom lines) and an operative second position (shown in solid lines). In its first position mirror 70 does not obstruct the viewfinder optics and functions to form a light seal with wall 38. In its second position, mirror 70 redirects flashlamp energy from lamp 32 into object space through the viewfinder's front optical element 24.

As shown in the dotted lines of FIG. 4, mirror 70 is a segment of an ellipse having two foci, $F_1$ and $F_2$. Mirror 70 is shaped so that one of the foci, $F_1$, coincides with the longitudinal axis of flashlamp 32, and the other foci, $F_2$, coincides with the principal plane of optical element 24. Thus, it may be appreciated that mirror 70 functions to relay an image of the flashlamp to the front of the camera housing, such image being substantially equal in size to the flashlamp. Note, since the frontal optical element of most viewfinders is a negative lens, it has a minifying effect on the size of the flashlamp, when viewed from object space through the optical arrangement shown in FIG. 1. The result is that the flashlamp appears smaller than it actually is and, since the flashlamp energy at a point in object space varies with the apparent size of the flashlamp, it is not as efficient in illuminating the scene. The use of an elliptical reflector, as shown in FIG. 4, overcomes the deficiency.

Figure 5:
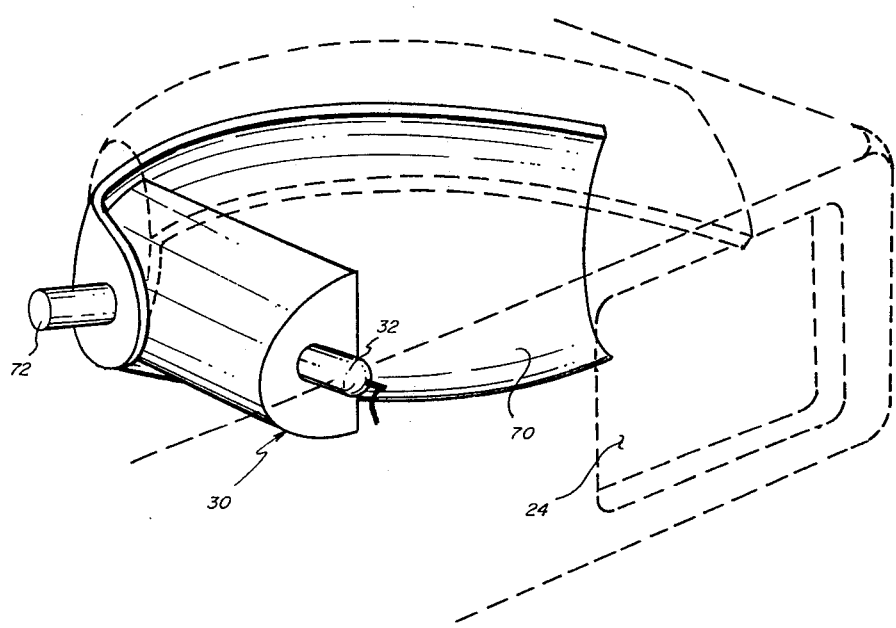

In FIG. 5, an alternative technique for movably mounting the elliptical mirror 70 is shown. In this embodiment, mirror 70 is rotatably mounted for movement about a pin 72. When in its inoperative first position (shown in phantom lines) the mirror is stored in the top (or bottom) of the viewfinder.

Figure 6:
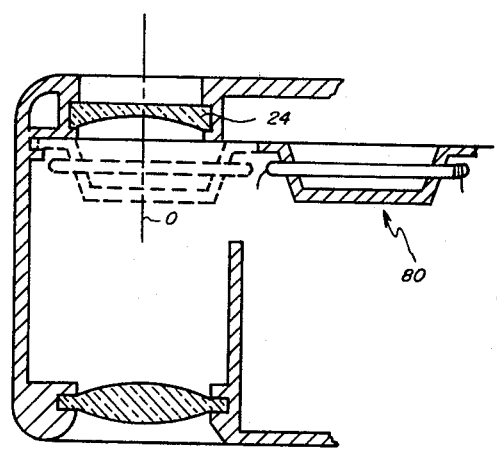
FIG. 6 illustrates an alternative embodiment of the invention.

In FIG. 6, another embodiment of the invention is shown to comprise a slidably mounted flash unit 80. In its inoperative position (shown in solid lines) the flash unit is positioned to the side of the optical path of the viewfinder optics. At the time of shutter release, the shutter release mechanism, unlatches the flash unit from its inoperative position and a spring (not shown) slides the flash unit to its operative position (shown in phantom lines) on the optical axis of optical element 24. The film advance mechanism of the camera is used to return the flash unit to its inoperative position prior to each new exposure. As shown in phantom lines in FIG. 6, optical element 24 can be positioned behind the movable flash unit to minimize optical losses.

The invention has been described in detail with particular reference to certain preferred embodiments thereof, but it will be understood that variations and modifications can be effected within the spirit and scope of the invention.

I claim:

1. In a photographic camera including a housing, a view finder through which objects to be photographed are viewable along an optical path by the camera user, the viewfinder optical path being separate from the optical path of the taking lens of the camera, and a flash unit including a selectively energizable flashlamp for illuminating such objects, the improvement comprising:
   (a) means for mounting the flashlamp in the interior of the camera housing; and
   (b) means for selectively directing light from the flashlamp, when energized, through the viewfinder and along said viewfinder optical path toward such objects to be photographed, said light-directing means comprising a light-reflective element and means for mounting said reflective element to said housing for movement between a first position displaced from the optical path of the viewfinder, and a second position intersecting said path, whereby light from the flashlamp is reflected by said element into object space when said element is in said second position.

2. The invention as defined by claim 1 further comprising switch means for preventing energization of the flashlamp except when said reflective element is in said second position.

3. The invention as defined by claim 1 wherein said reflective element is pivotally mounted for movement between said first and second positions.

4. The invention as defined by claim 1 wherein said reflective element has an elliptical light-reflecting surface.

5. The invention as defined by claim 1 wherein said light-reflecting element, when in said second position, cooperates with the camera housing to prevent light from the flashlamp from being seen in the viewfinder by the camera user when viewing objects to be photographed through the viewfinder.

6. The invention as defined by claim 1 wherein said directing means comprises means for slidably mounting the flashlamp for movement between a first position in which the flashlamp is displaced from said optical path, and a second position in which the flashlamp is located on said optical path.

7. In a photographic camera comprising a housing, at least one optical element through which objects to be photographed are viewed by the camera user, the optical element being independent of the taking lens of the camera, and a flash unit including an energizable flashlamp for momentarily illuminating such objects, the improvement comprising:
   (a) means for supporting the flashlamp within the camera housing; and
   (b) means for directing light emanating from the flashlamp through the optical element of the viewfinder into object space, said light-directing means comprising a mirror and means for pivotally mounting said mirror for movement between a first position in which said mirror functions, in cooperation with the camera housing, to prevent the flashlamp from being seen through the viewfinder, and a second position in which said mirror functions to both reflect light from the flashlamp through said optical element of the viewfinder and to prevent, in cooperation with the camera housing, such light from being seen by the camera user in viewing objects to be photographed through the viewfinder.

8. The invention as defined by claim 7 wherein said mirror has an elliptical reflective surface having first and second spaced foci, said reflective element being shaped so that when said reflective element is in said second position, the flashlamp is at one foci thereof and the other foci is either in the plane of the optical element of the viewfinder or in object space.

9. The invention as defined by claim 7 further comprising switch means for preventing energization of the flashlamp except when the said mirror is in said second position.

10. In a photographic camera comprising a housing, a veiw finder through which objects to be photographed are viewable along an optical path by the camera user, the optical path of the viewfinder being independent of the optical path of the taking lens of the camera, selectively actuatable shutter release means for actuating a shutter mechanism, and a flash unit including an energizable flashlamp for illuminating such objects, the improvement comprising:
   (a) means for mounting the flashlamp in the interior of the camera housing;
   (b) light-directing means mounted within the camera housing for movement between a first position spaced from said viewfinder optical path and a second position intersecting said viewfinder optical path, said light-directing means being effective in said second position to direct light emanating from an energized flashlamp through the camera viewfinder toward the objects to be photographed; and
   (c) means operatively coupled to the shutter release means for moving said light-directing means from said first to said second position in timed relation with actuation of said shutter release means.

11. The invention as defined by claim 10 wherein said light-directing means comprises a mirror and means for mounting said mirror to the camera housing for movement between said first and second positions.

12. The invention as defined by claim 11 wherein said mirror, when in said second position, cooperates with the camera housing to prevent light from the flashlamp from being seen in the viewfinder by the camera user when viewing objects to be photographed through the viewfinder.

13. The invention as defined by claim 12 further comprising switch means for preventing energization of the flashlamp except when said mirror is in said second position.

14. The invention as defined by claim 10 wherein said light-directing means comprises means for slidably mounting the flashlamp for movement between said first and second positions.

* * * * *